United States Patent
Goring et al.

(10) Patent No.: US 7,983,209 B2
(45) Date of Patent: Jul. 19, 2011

(54) SYSTEM AND METHOD FOR PRODUCING NOTIFICATION BASED WEB SERVICES

(75) Inventors: Bryan Goring, Milton (CA); Brindusa Fritch, Toronto (CA); Viera Bibr, Kilbride (CA)

(73) Assignee: Research In Motion Limited, Waterloo, Ontario (CA)

( * ) Notice: Subject to any disclaimer, the term of this patent is extended or adjusted under 35 U.S.C. 154(b) by 1688 days.

(21) Appl. No.: 11/107,917

(22) Filed: Apr. 18, 2005

(65) Prior Publication Data

US 2006/0251125 A1 Nov. 9, 2006

(51) Int. Cl.
*H04B 7/212* (2006.01)
(52) U.S. Cl. ........ 370/324; 370/328; 370/350; 370/503; 370/507
(58) Field of Classification Search .......... 370/466, 370/351, 464, 467, 395.31, 328, 324, 350, 370/503, 507
See application file for complete search history.

(56) References Cited

U.S. PATENT DOCUMENTS

| | | | | |
|---|---|---|---|---|
| 6,763,384 B1 * | 7/2004 | Gupta et al. | ............... | 709/224 |
| 7,127,700 B2 * | 10/2006 | Large | ............... | 717/100 |
| 7,152,090 B2 * | 12/2006 | Amirisetty et al. | ............ | 709/200 |
| 7,404,189 B2 * | 7/2008 | Benedetti | ............ | 719/317 |
| 7,433,835 B2 * | 10/2008 | Frederick et al. | ............ | 705/26 |
| 7,467,389 B2 * | 12/2008 | Mukkamala et al. | ......... | 719/316 |
| 7,603,469 B2 * | 10/2009 | Fletcher et al. | ............ | 709/229 |
| 7,698,398 B1 * | 4/2010 | Lai | ............ | 709/223 |
| 2001/0034225 A1 * | 10/2001 | Gupte et al. | ............ | 455/412 |
| 2003/0093403 A1 | 5/2003 | Upton | | |

(Continued)

FOREIGN PATENT DOCUMENTS

WO WO 2005/027455 A 3/2005

OTHER PUBLICATIONS

IBM et al, "Web Services Eventing", Aug. 1, 2004, 38 pages, XP2347494, Retrieved from the Internet: URL: ftp://www6.software.ibm.com/software/developer/library/ws-eventing/WS-Eventing.pdf>.

(Continued)

*Primary Examiner* — Ricky Ngo
*Assistant Examiner* — Dewanda Samuel
(74) *Attorney, Agent, or Firm* — Gowling Lafleur Henderson LLP; Xiang Lu

(57) ABSTRACT

A system and method for converting a schema based synchronous service to a schema based asynchronous service. The asynchronous service for implementing on a server configured for communication with a respective client over a network. The system and method comprising a subscription module for identifying a port type with each notification method added to a description of the synchronous service and for associating a subscription operation with the identified port type. The system and method can also include an artifact module for generating at least one conversion artifact related to the added notification method, the conversion artifact configured for use by a developer to assist in developing the supporting clients of the asynchronous service as well as the asynchronous service itself. The system and method can also include an integration module for combining the notification methods and subscription operations and conversion artifacts to produce a description of the asynchronous service. The developer uses the asynchronous service description for generating a service implementation of the schema based asynchronous service to include appropriate business logic for subsequent installation in the server as an asynchronous service interface.

18 Claims, 5 Drawing Sheets

U.S. PATENT DOCUMENTS

| | | | |
|---|---|---|---|
| 2003/0097485 A1 | 5/2003 | Horvitz et al. | |
| 2003/0135628 A1* | 7/2003 | Fletcher et al. | 709/229 |
| 2004/0122892 A1* | 6/2004 | Brittenham et al. | 709/203 |
| 2004/0199636 A1* | 10/2004 | Brown et al. | 709/227 |
| 2004/0267876 A1* | 12/2004 | Kakivaya et al. | 709/200 |
| 2005/0063335 A1* | 3/2005 | Shenfield et al. | 370/329 |
| 2005/0071423 A1* | 3/2005 | Rajaniemi | 709/203 |
| 2005/0203949 A1* | 9/2005 | Cabrera et al. | 707/103 R |
| 2006/0025113 A1* | 2/2006 | Nguyen et al. | 455/412.1 |
| 2006/0048097 A1* | 3/2006 | Doshi | 717/120 |
| 2006/0136489 A1* | 6/2006 | Thome et al. | 707/103 R |
| 2006/0143275 A1* | 6/2006 | Stephens et al. | 709/206 |

OTHER PUBLICATIONS

Tcherevik D, "A publish/subscribemechanism for Web services: extending an existing brokerWSJ Feature", Feb. 2, 2003, pp. 1-8, XP002306218, vol. 3, No. 2, Web Services Journal, Sys-Con Media, Montvale, NJ, United States.

"European Search Report" for European Application No. EP05103084, Nov. 8, 2005, 11 pages, 1082-0234, European Patent Office, Directorate General 1.

* cited by examiner

SYSTEM AND METHOD FOR PRODUCING NOTIFICATION BASED WEB SERVICES

The present invention relates to notification based communications of schema based services.

BACKGROUND OF THE INVENTION

In real-life network applications there is a lot of information that is available to a user but hardly accessible, as the user doesn't know when the information is posted or when there is a change in the status of the posted content. Such information ideally needs to be "pushed" over the network to the user either periodically or when certain predefined events occur. Some examples of possible push situations are arrival of new e-mail, stock market information, multi-user game updates, etc. A push notification can be a Boolean value which informs the client device that a detailed response is available for retrieval from the web service. Alternatively, the push notification can return the updated data in response to an earlier submitted request message from the client device.

Web Services have become a ubiquitous standard for access to content resources as well as communicating to back-end servers. Their number and complexity have increased considerably in recent years. However, invoking Web Service operations from a wireless device using synchronous communication methods exclusively is considered expensive and impractical. Most Web Services employ protocols with a large footprint (e.g. SOAP) and are designed mostly for synchronous communication ("request/response" or "pull") on wired networks. In a synchronous scenario, the client initiates the communication by sending a request to the server and waits to receive the response on the same connection. However, in the wireless space, where resources and bandwidth can be limited and data traffic cost can be hit, synchronous communication is undesirable.

A common technique to deliver content to the wireless device is when the user of the device requests or "pulls" the content from the network. In other words, the content is constantly present in the network, but the user needs to issue retrieval request to access the information (e.g. using a browser on the mobile device). Current wireless systems operate by the wireless device repeatedly polling the server for data to satisfy the request. From a practical point of view, wireless communications can have higher cost than wired communications and usually are characterized by higher latency times, making a 'pull' from a wireless device inherently expensive. Slow connection times sometimes might be critical to the user's experience, such as extended wait times to process the request, including periodic loss of services connection during the wait time.

By and large all publicly available web-services are based on request/response. There is no widespread availability of notification-based web-services due to lack of standardization in the industry. Furthermore, the toolsets available for generating and working with web-services do not provide the extended functionality required to support notifications. As a result, to provide notification capability, service providers are faced with coming up with their own ad-hoc solution. In general, notifications are important to the efficiency and value of wireless applications.

SUMMARY OF THE INVENTION

It is an object of the present invention to provide a system and method for transforming a standard request/response style web-service definition into an asynchronous based web-service definition to obviate or mitigate at least some of the above presented disadvantages.

Web Services have become a ubiquitous standard for access to content resources as well as communicating to back-end servers. Their number and complexity have increased considerably in recent years. However, invoking Web Service operations from a wireless device using synchronous communication methods exclusively is considered expensive and impractical. However, in the wireless space where resources and bandwidth can be limited and data traffic cost can be high, synchronous communication is undesirable. Contrary to present communication systems there is provided a system and method for converting a schema based synchronous service to a schema based asynchronous service. The asynchronous service for implementing on a server configured for communication with a respective client over a network. The system and method comprising a subscription module for identifying a port type with each notification method added to a description of the synchronous service and for associating a subscription operation with the identified port type. The system and method can also include an artifact module for generating at least one conversion artifact related to the added notification method, the conversion artifact configured for use by a developer to assist in developing the supporting clients of the asynchronous service as well as the asynchronous service itself. The system and method can also include an integration module for combining the notification methods and subscription operations and conversion artifacts to produce a description of the asynchronous service. The developer uses the asynchronous service description for generating a service implementation of the schema based asynchronous service to include appropriate business logic for subsequent installation in the server as an asynchronous service interface.

According to the present invention there is provided a system for converting a schema based synchronous service description to a schema based asynchronous service description, the asynchronous service description for implementing on a server configured for communication with a respective client over a network, the system comprising: a subscription module for defining a port type for a notification method associated with the synchronous service description and for assigning a subscription operation to the defined port type; an artifact module for generating at least one conversion artifact related to the notification method, the conversion artifact configured for use by a developer to assist in developing a deployable service implementation of the asynchronous service description; and an integration module for combining the notification method and the subscription operation and the conversion artifact to produce the asynchronous service description; wherein the asynchronous service description is configured for subsequent use by the developer for generating the deployable service implementation to include appropriate business logic for subsequent installation in the server as an asynchronous service interface.

According to a further aspect there is provided a method for converting a schema based synchronous service to a schema based asynchronous service, the asynchronous service for implementing on a server configured for communication with a respective client over a network, the method comprising the steps of: defining a port type for a notification method associated with the synchronous service description; assigning a subscription operation to the defined port type; generating at least one conversion artifact related to the notification method, the conversion artifact configured for use by a developer to assist in developing a deployable service implementation of the asynchronous service description; and combining the notification method and the subscription operation and the conversion artifact to produce the asynchronous service description; wherein the asynchronous service description is configured for subsequent use by the developer for generating the deployable service implementation to include appropriate business logic for subsequent installation in the server as an asynchronous service interface.

BRIEF DESCRIPTION OF THE DRAWINGS

These and other features of the preferred embodiments of the invention will become more apparent in the following detailed description in which reference is made to the appended drawings, by way of example only, wherein.

DESCRIPTION OF THE PREFERRED EMBODIMENTS

Network System

Figure 1:
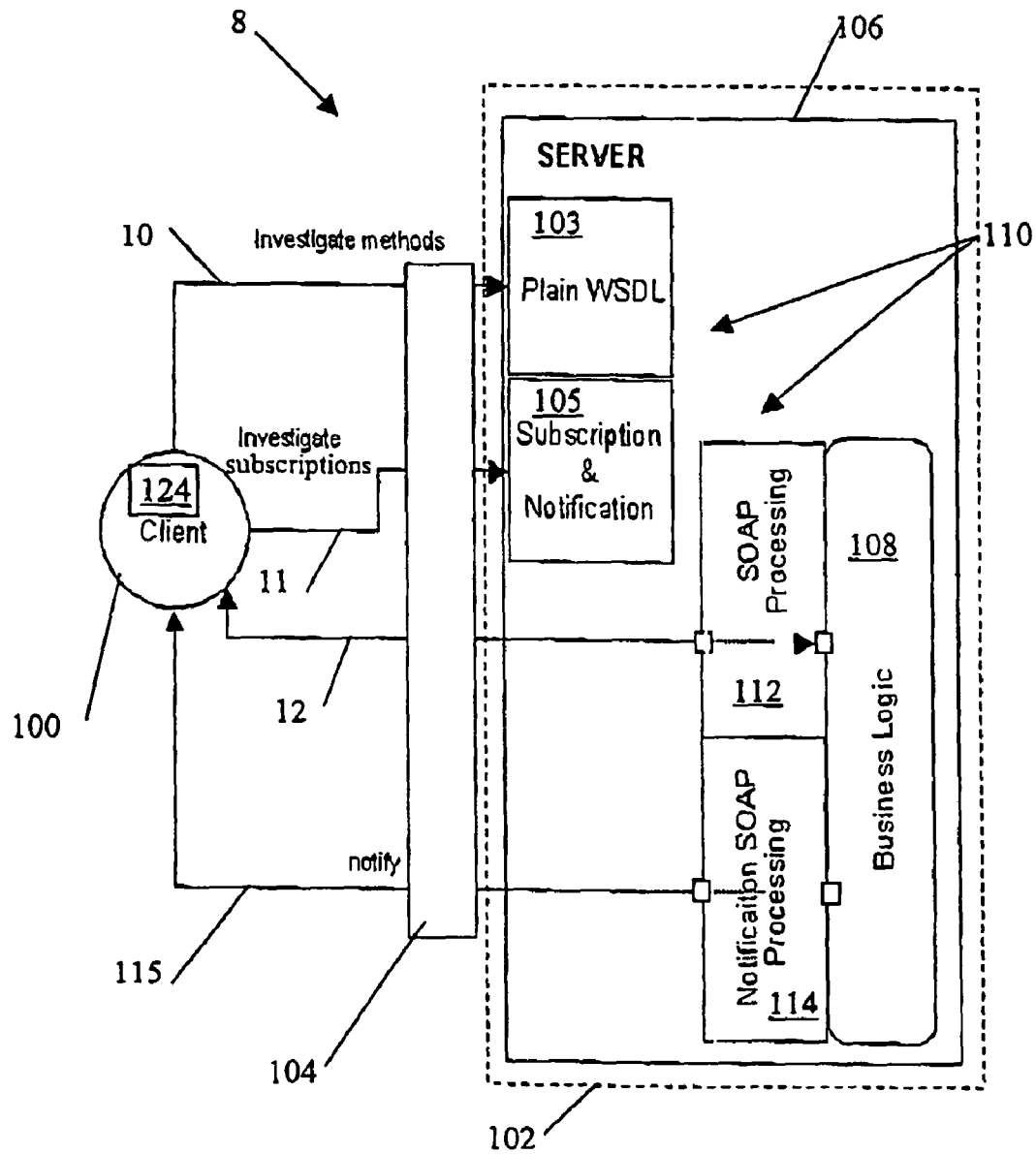
FIG. 1 is a block diagram of a network communication system.

Referring to FIG. 1, a communication system 8 has a plurality of clients 100, such as but not limited to wireless devices and desktop computers, communicating via query/request 10 and response 12 communications through a gateway server 104 (which can be wireless based) and ultimately with one or more generic schema defined services 102 (e.g. web services). The communications between the gateway 104 and the clients 100, and between the gateway 104 and the services 102, are done over a network (not shown) such as but not limited to intranets and extranets (e.g. the Internet). It is also recognized that the clients 100 can communicate directly (not shown) with the services 102 without the interaction of the gateway 104, as desired. However, for demonstration purposes only, operation of the system 8 will be hereafter described using the gateway 104. The service 102 can operate using requests 10 and responses 12 delivered as synchronous communications, in combination with asynchronous 115 communications, as further described below. The generic services provided by the service 102 can be Web Services and/or other generic services such as but not limited to SQL Databases, IDL-based CORBA and RMI/IIOP systems, Legacy Databases, J2EE, SAP RFCs, and COM/DCOM components. The service 102 is described by a service interface 110 including a service definition 103 representing a source schema definition of the service 102, and subscription, unsubscription and notification objects/elements 105 descriptions. The service 102 is connected to the gateway 104 by a web server 106. It is recognised that the functionality of the server 106 could be hosted on one server or on a distributed network of servers, as desired. Further, it is recognised that the server 106 could be provided as part of, or separate to, the service 102.

The web services 102 (sometimes called application services) are services (usually including some combination of programming and data, but possibly including human resources as well) that are made available from a business's web server 106 for Web users or other web-connected programs of the clients 100. For example, web services 102 can range from such major services as storage management and customer relationship management (CRM) down to much more limited services such as the furnishing of a stock quote and the checking of bids for an auction item. Business logic 108 of the service 102 is exposed to the clients 100 over the network via the communication interfaces 110, which can support both synchronous and asynchronous communication, as further described below. The interfaces 110 include a SOAP processing module 112 for providing synchronous response communications 12 to the client 100, and a SOAP processing module 114 for providing notification based (i.e. asynchronous) communications 115. The web server 106 can be a program that, using the client/server model and the Internet's Hypertext Transfer Protocol (HTTP), serves files that form Web pages (or other application data as XML fragments) to the clients 100 (whose computers contain HTTP clients that forward their request 10 and subscription 11 communications to the service 102). Examples of web servers 106 can include such as but not limited to Tomcat, Apache, Microsoft's Internet Information Server (IIS), Novell's Web Server and IBM's family of Lotus Domino servers. It is recognized that the interfaces 110 can be based on communication protocols other than SOAP and HTTP, as desired.

Service 102 Environment

Referring again to FIG. 1, the web service 102 provides information communications 12,115 which can be used by client applications 124 provisioned on the clients 100. It is noted that the client applications 124 are configured to communicate with the service 102 (e.g. the application 124 can formulate request communication 10 expected by the service 102 as well as can process response communications 12,115 expected from the service 102). The configuration of the client applications 124 is based on knowledge of the service definition 103 and objects/elements 105 of the service 102, as further described below. Alternatively, or in addition, the web service 102 may receive and use the communications 10, 11 provided by the client applications 124 executed on the clients 100, or perform tasks on behalf of client applications 124 executed on the clients 100. The web service 102 can be defined as a software service of the server 106, which can implement the communication interfaces 110 expressed using for example, such as but not limited to, Web Services Description Language (WSDL) registered in a Universal Discovery Description and Integration (UDDI) Registry (not shown) and can communicate through communications 12,115 with the clients 100 by being exposed over the gateway 104 through the Simple Object Access Protocol (SOAP).

The Web Services Description Language (WSDL) is an XML-based language used to describe the services (i.e. exemplified by the business logic 108) a business offers and to provide a way for individuals and other businesses to access those services electronically. WSDL is the cornerstone of the Universal Description, Discovery, and Integration (UDDI) initiative spearheaded by Microsoft, IBM, and Ariba. UDDI is an XML-based registry for businesses worldwide, which enables businesses to list themselves and their services on the Internet. WSDL is the language used to do this. WSDL is derived from Microsoft's Simple Object Access Protocol (SOAP) and IBM's Network Accessible Service Specification Language (NASSL). WSDL replaces both NASSL and SOAP as the means of expressing business services in the UDDI registry.

SOAP is a specification that defines the XML format for the communications 10, 11, 12, 115, including a well-formed XML fragment enclosed in SOAP elements. Other parts of SOAP specify how to represent program data as XML and bow to use SOAP to do Remote Procedure Calls (RPC). These optional parts of SOAP are used to implement RPC-style applications where the SOAP request communication 10, 11 contains a callable function, and the parameters to pass to the function, is sent from the client 100, and the service 102 returns the response communication 12,115 with the results of the executed function. SOAP also supports document style applications where the SOAP communication 10, 11, 12, 115 is a wrapper around an XML document. A further optional part of SOAP defines the HTTP binding (i.e. header), whereas some SOAP implementations support MSMQ, MQ Series, SMTP, or TCP/IP transport protocols. Alternatively, the web service 102 may use other known communication protocols, message formats, and the interfaces 110 may be expressed in other web services languages than described above.

In general, web services 102 come as a replacement for legacy Browser-based and Client-Server TCP/IP connected infrastructure and applications. Originally started as a generic machine-to-machine (M2M) communication protocol, web services 102 are becoming a standard for any service-to-service (S2S) or service to consumer (S2C) communications. Based on a set of standard protocols (e.g. WSDL, SOAP, UDDI), web services 102 can provide a platform neutral communication pipe, for example XML-based, that can support synchronous and/or asynchronous communications 10, 11, 12, 115. The system 8 of FIG. 1 can relate to the S2C model and deals with the consumer of the web service operating from some generic client 100. Accordingly, the services supplied by the server 106 are utilized by the user of the clients 100 over the gateway 104. It is recognised that schema definitions other than WSDL can be used to describe the service description 102 and associated objects/elements 105.

In other cases, it is recognised that the user through the means of the client application 124 itself will send a command or registration communication 11 to the web service 102 to identify data format and specific rules and conditions for the asynchronous communications 115, including a message ID number/label for inclusion with the asynchronous communication 11,115 so as to identify which notification communication 115 corresponds with which subscription request communication 11. It is further recognised that external entities can also send the registration communication 11 to the service 102 on behalf of the client 100.

Service 102 Eventing

One direction for standardization in the area of notification based web-services 102 is the WS-EVENTING standard, which has been embraced by significant software companies such as IBM, Microsoft, Sun and BEA. The WS-EVENTING standard provides both the language (i.e. schema) and the contract to which notification based web-services 102 must adhere.

Referring to FIG. 1, the WS-EVENTING constructs (e.g. Subscription, SubscriptionResponse, Unsubscription, Notifications) can be specified as elements/objects 105 in conjunction with the service definition 103. Accordingly, DOCUMENT style definitions are utilized to incorporate the WS-EVENTING schema. A Document Type Definition (DTD) is a specification (e.g. HTML based) defining and constraining definition or set of statements that follow the rules of the Standard Generalized Markup Language (SGML) or of the Extensible Mark-up Language (XML), a subset of SGML. The DTD specification is shared knowledge between the client 100 and the server 106, and can accompany a document included in the communications 10, 11, 12, 115 (or otherwise hosted at the client 100 and server 106 sides). The DTD identifies what the codes (i.e. markup tags) are that, in the case of a text document, separate paragraphs, identify topic headings, and so forth and how each is to be processed. By providing the DTD in association with the transmitted document, any client 100 that has a DTD "reader" (or "SGMYL compiler") will be able to process the document in the communications 10, 11, 12, 115 and process the document as intended (e.g. display, store, print). For example, the "compiler" or document handler can be a Web browser which is designed to handle the text documents of the communications 10, 11, 12, 115 encoded with HTML tags, which are interpreted using the HTML DTD specification. It is recognized that the elements 105 can be combined or in addition to the basic service definition 103.

WS-EVENTING uses the communications 11 to set up Subscription & Notification Contracts. For subscription communications 11, a subscription object is sent from the Event Sink (e.g. Application Gateway 104 or directly from the client 100) to the web service 102 to indicate interest to receive a particular notification communication 115. The subscription communication 11 contains a FILTER that specifies information on what data is of interest to the subscribing client 100 (typically the client application 124). This information can include such as but not limited to:

a) the web-service 102 provides a Subscribe method for each notification type, where the Subscribe method accepts a WS-EVENTING SubscriptionRequest (e.g. communication 11);

b) the web-service 102 returns a SubscriptionResponse (e.g. communication 115) that includes a unique cancellation-id that the web service 102 generates;

c) the web-service 102 stores a subscription-id that is included in the any notification generated for this subscription;

d) the web-service 102 stores a notify-to address which is used to indicate where to send the notification; and e) the web-service 102 stores the namespace of the subscribing party of the notification.

For unsubscription, the web-service 102 provides an Unsubscribe method for each notification type. The unsubscribe method accepts a WS-EVENTING Unsubscribe object.

For sending notification communications 115, the web-service 102 (e.g. Event Source) generates the proper SOAP message containing a header field that specifics the subscription-id to which the notification communication 115 applies. The SOAP message is generated by the SOAP notification module 112 (see FIG. 1).

It is noted that the Application Gateway 105 can formulate the Subscription and Unsubscription messages, process SubscriptionResponse messages and consume Notifications, all on behalf of the client 100. All of these interactions can be done via SOAP according to the language and contract specified in the WS-EVENTING standard in support of asynchronous communications 115.

Asynchronous Communications 11,115

Referring again to FIG. 1, asynchronous/notification based web services 102 can be defined as services 102 that are invoked (via the communication 11) over existing web protocols by the client 100 that does not wait for the response communication 115 on the same connection/channel, but does expect the response communication 115 at a later time on a different connection/channel. Therefore, the sender (e.g. client 100) can submit the initial communication 11, and then go about its work. If the response communication 115 does come, then the original sender can pick it up when it wants. E-mail is one example where asynchronous communication between the client 100 and the service 102 is desired. A further example of asynchronous communication 115 is the performing of long-running transactions where the transaction might have multiple steps, for example, company A submitting a purchase order to company B, who fulfills the order and then submits the invoice to company A, who pays it. Such a transaction might take weeks, and thus should be handled asynchronously.

In the asynchronous scenario, the client device 100 can initiate subscriptions/notifications with the service 102 by sending the initial communication 11 to the server 106 via the gateway 104, on a connection, and expect to receive the appropriate response as the asynchronous response communication 115 on a different connection. In asynchronous communications 115, the push notification is used to send the appropriate data to the client 100 as soon as the data is available and/or the predefined response conditions have been met to trigger the data transmission as the communication 115. For example, the communication 115 may be a compilation of numerous data instances sent by the service 102 to the server 106, meant to be transmitted to the device 100 as aggregated or individual notifications contained in the notification communication(s) 115, in response to the original communication 11 and/or internal service 102 message generation (i.e. not specifically related to any external communication 11). The communication protocol and client 100 addressing are device-specific and the server 106 is aware of the protocol and addressing, for example via the request communication 11. It is recognized that the request communication 11 could be manipulated by the server 106, if desired, as well as being an internal command (no interaction with the server 106) generated by the service 102 using known addressing information of the client 100 (e.g. addressable wireless devices) or being an external command generated by an external entity (not shown). The push communication 115 can be a Boolean value which informs the client 100 that the detailed communication 115 is available for retrieval from the web service 102. Alternatively, the push communication 115 can return the updated data in the communication 115 in response to the communication 11 of the client 100 or as a result of internal service 102 commands or third party requests.

Referring again to FIG. 1, in the synchronous scenario, the client 100 initiates the synchronous request communication 10 with the service 102 by sending the initial request to the server 106 via the gateway 104, on a connection, and expects to receive the appropriate response as the synchronous response communication 12 on the same connection. The delivery of synchronous content to the client 100 is when the user of the client 100 requests or "pulls" the content from a network (not shown). In other words, the content is constantly accessible by the network, but the user needs to issue the request communication 10 to ultimately access the information (e.g. using a browser on the client 100). In general, synchronous Web services 102 can be defined as services that are invoked over existing Web protocols by the client 100 that blocks/waits for the response. In program-to-program communication, synchronous communications 10,12 require that each end (i.e. the client 100 and the service 102) respond in turn without initiating a new connection. A typical activity that might use a synchronous protocol would be a transmission of files from one point to another. As each synchronous request communication 10 is received, the synchronous response communication 12 is returned indicating success or the need to resend regarding the previous synchronous request communication 10. Each successive transmission of data on the same synchronous connection requires the response communication 12 to the previous request communication 10 before a new request communication 10 can be initiated between the client 100 and the service 102. Therefore, the synchronous communications 10,12 consist of round-trip communications in which the sender (for example the client 100 or the service 102) waits for the appropriate reply. It is recognised that the synchronous communications 10,12 could be other than shown in FIG. 1, in which the service 102 initiates the synchronous request communication 10 with the client 100 and expects to receive the corresponding synchronous response communication 12 from the client 100. Examples of synchronous communications 10,12 are submitting a Web page form and waiting for a confirmation page, as well as typical transactions—say, transferring money from checking to savings. These example transactions must take place very quickly and reliably, because the various systems involved must wait to make sure the transaction was successful before they go about their business. Accordingly, it is recognized that the synchronous communications 10,12 involve transmitted and received signals over the same connection/channel established between the client 100 and the service 102.

Accordingly, the clients 100 can be configured to transmit and receive both asynchronous and synchronous communications 10,11,12,115 when in communication with the server 106 of the web service 102, or just configured for asynchronous communication 11,115, as desired. The client 100 can operate as a web client of the web service 102 by using the communications 10,11,12,115 in the form of message header information and associated data content, for example requesting and receiving product pricing and availability from an on-line merchant. The web service 102 is an example of a system with which client application programs 124 on the clients 100 interact via the wireless gateway 104 in order to provide utility to users of the client 100. The communications 10,11,12,115 sent between the client 100 and the web service 102 could traverse a message-map service (not shown) which converts the communications 10,11,12,115 between differing formats used by the clients 100 and the web services 102. For satisfying the appropriate communications 10,11,12,115, the web service 102 can communicate with the application 124 through various protocols (such as but not limited to HTTP and component API) for exposing relevant business logic 108 (methods) to the client application 124 once provisioned on the client 100. The application programs 124 of the client 100 can use the business logic 108 of the service 102 similarly to calling a method on an object (or a function). It is recognized that the client application programs 124 can be downloaded/uploaded in relation to the service 102, through the communications 10,11,12,115 via the gateway 104, directly to the client 100. It is further recognized that the client 100 can communicate with one or more web services 102 and associated servers 106 via the gateway 104.

Conversion Tool

Figure 2:
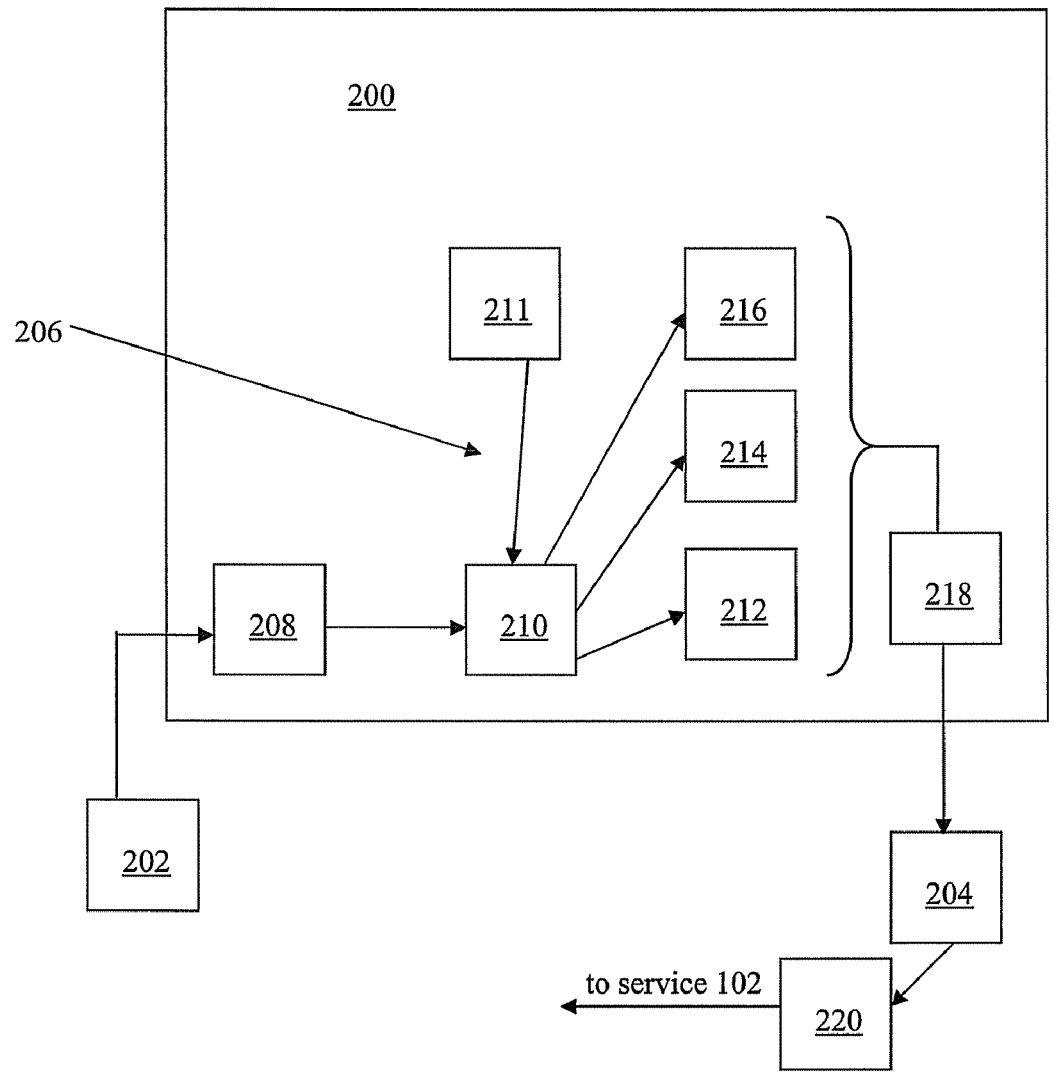
FIG. 2 is a block diagram of a conversion tool to generate the service interfaces of the system of FIG. 1.

Referring to FIG. 2, a conversion tool 200 is shown for facilitating the automated transformation of a standard web service description 202 (i.e. request/response) into a WS-EVENTING style service description 204 (i.e. notification based). Use of the conversion tool 200 allows a developer to construct an automated build environment for the notification service 204 based on Ant scripts, scripts used by way of example only. The tool 200 contains a series of build modules 206 based on Ant, for example, which is an open source software for putting together all the pieces of a program (e.g. service 204) from the Apache Software Foundation. Some of the modules 206 perform the transformation and incorporate standard asynchronous based elements such as subscriptions and other modules 206 produce server 106 artifacts (skeleton and stub classes described below—embodied in objects/elements 105 of FIG. 1) that can be utilized to deliver the soap-based notification through standard tools (e.g. AXIS). The Ant based modules 206 can be independent of both platform and development environment. However, it is noted that other options for the build modules 206 can be based on Make, which uses a particular shell or command interface, and for that reason are limited to the type of operating system that uses that shell. In the preferred embodiment, the Ant based modules 206 use Java classes rather than shell-based commands. Accordingly, XML is used to describe the modules 206 in the conversion tool 200, what those modules 206 should do, and any dependencies between the modules 206 and other parts of the conversion tool 200. In general, Ant determines the parts of the program that have been changed since the last compilation, as well as any parts of the program (e.g. interface service description 204) that are dependent on those components, and then compiles only those parts that require it, in the proper order.

The input to the tool 200 (i.e. service descriptions/definitions 202) can be regular Java interface class(es) that the developer would normally provide to define their ultimate service interface 110 (see FIG. 1). The output is the interface service description 204 with artifacts required to support the interfaces 10 (skeleton & notification stubs—for example objects/elements 105—see FIG. 1). It should be noted that the conversion tool 200 may not build the complete web service 102. There may still be coding required by the developer to provide the intelligence (i.e. operable business logic 108) of the deployed service definition 103 itself, for example by further developing the subscription description 304 and related elements/objects 105 (see FIG. 3). It should be noted that the deployed service definition 103 is represented by the generated interface service description 204 (generated by the tool 200) when deployed.

Figure 3:
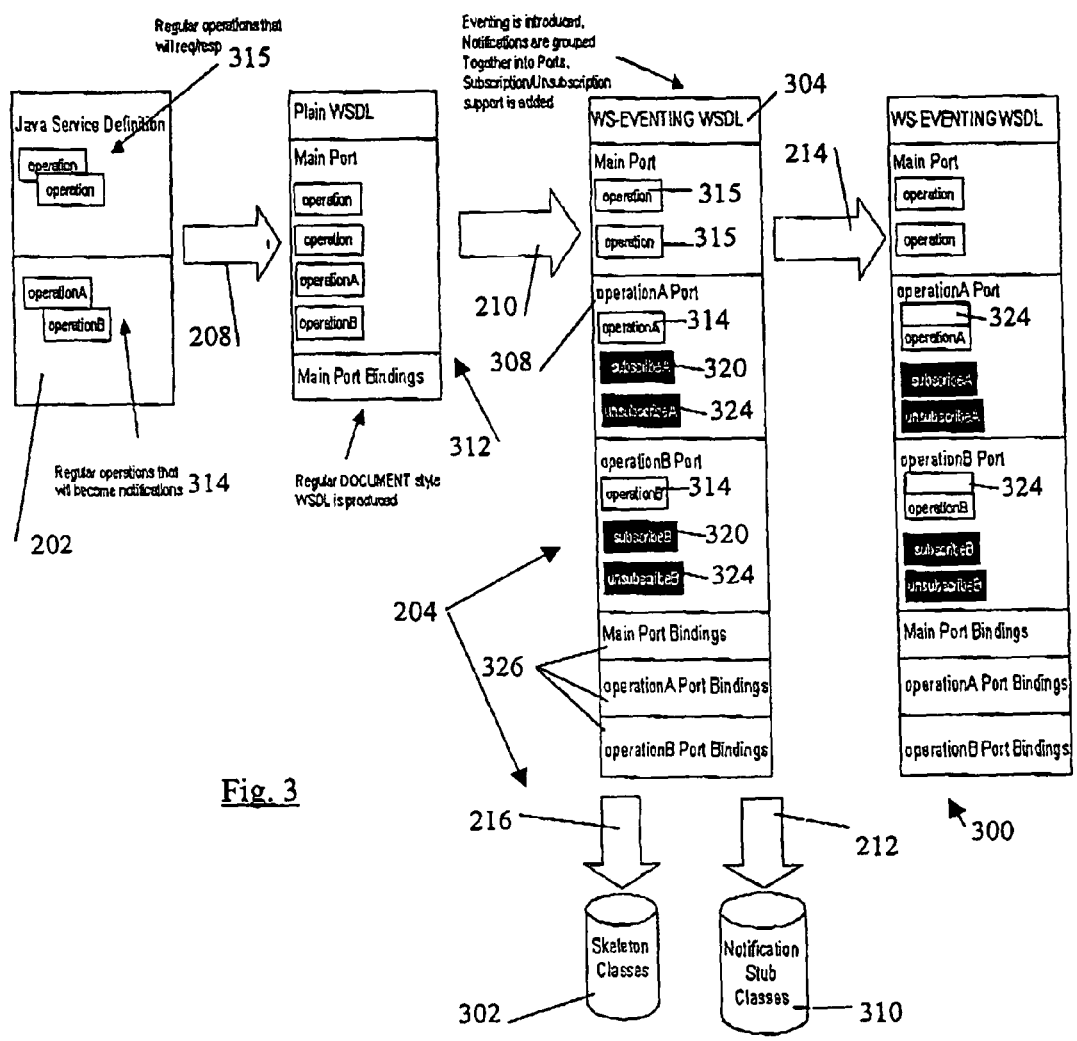
FIG. 3 shows an overall example conversion for the service interface descriptions of FIG. 1.
Figure 4:
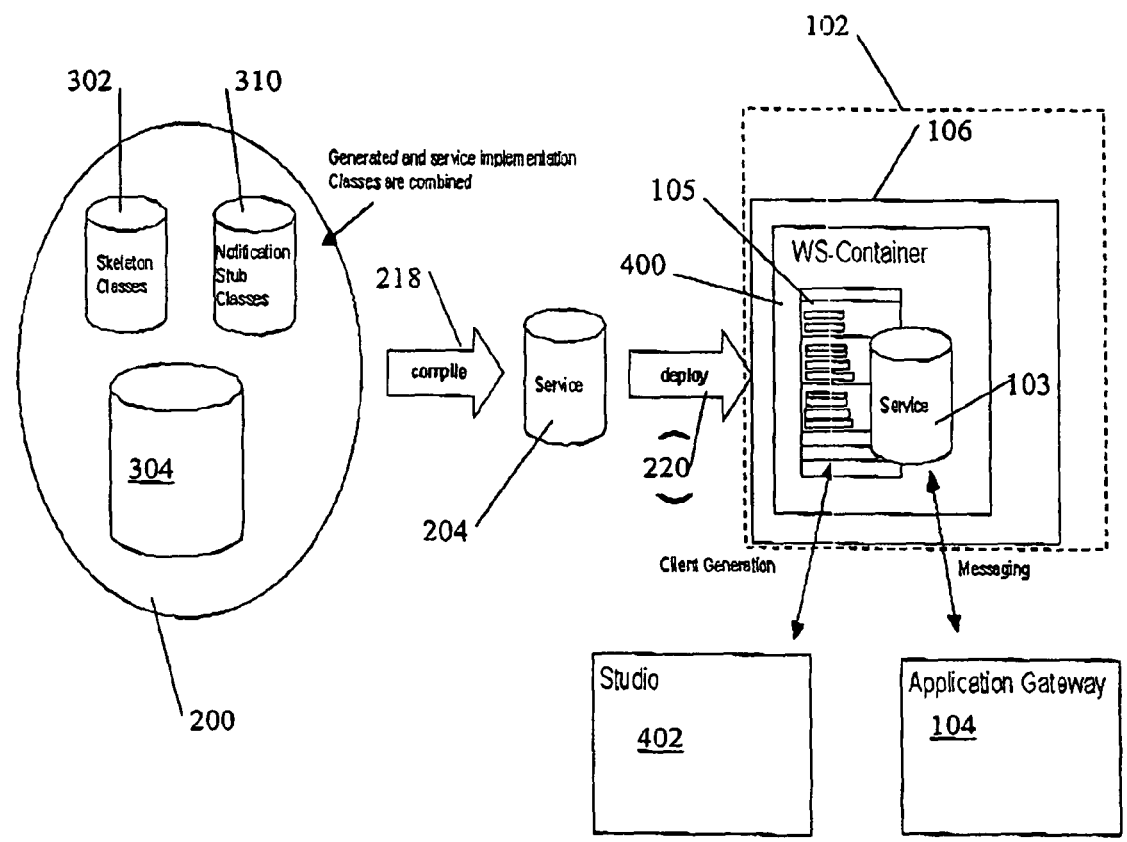
FIG. 4 is a block diagram showing deployment and use of the generated service interface of the system of FIG. 1.

Referring to FIGS. 3 and 4, the conversion tool 200 outputs the transformation artifacts as objects/elements 105 for use by the web-service developer or by an application development tool 402 to generate supporting client applications 124 for the web service 102. The artifacts include the deployed service definition 103 and objects/elements 105 such as but not limited to:

a) subscription description WSDL 304 which redefines the proposed input service description (Java IF) 202 to support WS-EVENTING subscription;

b) modified service WSDL description 300 such that the WSDL is customized specifically to allow the application tool 402 to detect and work with the notifications (i.e. operations 314) included in the modified service WSDL description 300;

c) server skeleton class framework 302 is the server side implementation of the service subscription description WSDL 304, and the server class framework 302 contains all required classes for marshalling/un-marshalling communication elements of the SOAP (for example) communication protocol on the interface 110 (see FIG. 1) and empty service implementation stubs for each port 308 generated in the subscription description WSDL 304. The developer is meant to substitute their service implementation stubs in place of the empty stubs as part of the procedure for generating and deploying the eventual deployed service 103 definition from the generated interface service description 204; and application gateway 104 notification stub class framework 310 such that a class is generated for each of the notification operations 314 identified to the tool 200 in the input service description 202 (see FIG. 2). This class framework 310 can be used to generate the proper SOAP message for delivering the notification communications 115 to the Application Gateway 104, as operated by the SOAP processing modules 112,114. To work with these stub classes of the class framework 310, the developer of the interfaces 110 (see FIG. 1) supplies a completed subscription data object in the input service description 202, as mentioned above.

For example, in object-oriented programming, the classes of the class frameworks 302,310 can be a template definition of the methods and variables in a particular kind of object. Thus, an object is a specific instance of the class; and the object contains real values instead of variables. The class is one of the defining ideas of object-oriented programming. Among the important ideas about classes are such as but not limited to:

the classes of the class frameworks 302,310 can have subclasses that can inherit all or some of the characteristics of the class;

in relation to each subclass, the class becomes the superclass;

subclasses can also define their own methods and variables that are not part of their superclass; and the structure of the class and its subclasses is called the class hierarchy.

It is recognised that a stub can be defined as a smaller program routine/interface that substitutes for a longer program, possibly to be loaded later or that is located remotely. For example, a program that uses Remote Procedure Calls (RPC) is compiled with stubs that substitute or otherwise act as the interface for the program that provides a requested procedure. The stub routine/interface accepts the request and then forwards it (through another program) to the actual remote procedure of the business logic 108. When that procedure has completed its service, it returns the results or other status to the stub routine/interface, which then passes it back to the program that made the request.

Referring to FIG. 2, the modules 206 of the conversion tool 200 include such as but not limited to:

a WSDL module 208 that transforms the input service description 202 into a WSDL document that represents the first synchronous WSDL description 312 (see FIG. 3), it is noted that the service description 202 can contain regular Java interface classes used to define the eventual web service 102 or can be a series of schema definitions (e.g. WSDL) for representation as the WSDL document description;

a subscription module 210 that transforms the existing request/response WSDL web service description 312 into the WS-EVENTING compliant WSDL description 304 for notification based services, where it is recognised that the module 210 can use a rule set 211 based on the WS eventing standard to assist in the transformation;

a notification module 212 (e.g. an artifact module) that generates dynamic AXIS based client stub classes 310 (see FIG. 3) to deliver notification communications 115 formatted using SOAP to the Application Gateway 104, using this module 212 can help alleviate the need to understand SOAP and AXIS invocation details by the developer;

a client module 214 (e.g. an artifact module) that transforms the WSDL description 304 of the service 204 to the WSDL description 300 (see FIG. 3) recognisable by the application development tool 402 for application 124 development (see FIG. 4) for denoting the notification operation 314 and/or subscriptions 320,322 (i.e. conversion artifacts) contained within the interface service description 204, such that the developer of the client 100 application (based on the WSDL interface service description 204) can determine which elements of the interface service description 204 are request/response based (i.e. synchronous) and which are notification based (i.e. asynchronous);

a service module 216 (e.g. artifact module) that generates a set of skeleton classes of the class framework 302 (see FIG. 3) (i.e. conversion artifacts) that will handle SOAP messaging; and a compilation module 218 (e.g. an integration module) for combining all generated classes of the frameworks 302,310 and WSDL description 304 (i.e. the defined service implementation) and to compile this information as the interface service description 204.

Also provided can be a deployment tool 220 which can be separate from the conversion too) 200. The deployment tool 220 prepares the service description 204 for deployment into AXIS, for example, in a web service container 400 (see FIG. 4) of the web server 10 as interfaces 110. The deployment tool 220 updates the AXIS generated server WSDD file for proper service deployment at a web server 106 (sec FIG. 4). It is recognised that the tool 402 is used by a developer to generate the client application 124, based or the service interfaces 110 exposed by the web server 106. It is recognised that the above described modules 206 were designed to work with AXIS web-services 102 (see FIG. 1), however other web service 102 types can be used, as desired. It is recognised that the service descriptions 103,105 included in the interfaces 110 can be part of a UDDI registry (not shown) for publication purposes.

Modules 206

Referring again to FIG. 3, the modules 206 are now described in greater detail.

The subscription module 210 transforms an existing request/response WSDL description 312 (for example as provided by the WSDL module 208) into a WSD description 304 that supports WS-EVENTING style subscription, i.e. subscriptions and notification elements 105 representing the operations 314 and the subscriptions 320/unsubscriptions 324 (see FIGS. 1 and 3). The following is a list of example parameters for the module 210.

| Parameters | Meaning |
|---|---|
| notificationmethodnames | Comma separated list of methods/operations 314 on input WSDL description 312 that are to be made as notifications |
| Inputwsdl | The WSDL description 312 produced by the module 208 (for example) that is to be transformed |
| Outputwsdl | The target WSDL description 304 produced |
| Verbose | Turn on verbose running (true/false) |
| Subscribetoken | The name that will be pre-pended to the notification operation 314 names to create WSDL subscribe operation 320 (default "subscribe") in the notification based WSDL descriptions 304 |
| Unsubscribetoken | The name that will be pre-pended to notification operation 314 names to create the unsubscribe operation 322 (default "unsubscribe"). |

The notification module 212 produces a dynamic stub as conversion artifacts suitable for working with Application Gateway 104 style notification communications 115. Using this module 212 helps to alleviate the need to understand SOAP and AXIS invocation details by the developer. The following is a list of example parameters for the module 212.

| Parameter | Meaning |
|---|---|
| notificationmethodnames | Comma separated list of method on input WSDL 312 that are to be made as notification operations 314 |
| Inputwsdl | The WSDL description 312 that is to be transformed |
| Verbose | Turn on verbose running (true/false) |
| Packagename | The package into which classes of the class framework 310 will be generated (file relative to output folder) |
| Outputfolder | The folder into which generated package will go |

The client module 214 transforms the subscription WSDL description 304 into the WSDL description 300 form recognized by the application development tool 402 for building notification clients as applications 124 for execution on the devices 100, using conversion artifacts. The recognition of the notification operations 314 and related subscription/unsubscribe operation 320,322 can be done by providing indicia 324 (see FIG. 3) in the WSDL description 304, so as to flag the developer of any present operations 314,320,322 in the development of the application 124 (using the application development tool 402). The following is a list of example parameters for the module 214.

| Parameter | Meaning |
|---|---|
| notificationmethodnames | Comma separated list of methods/operations on input WSDL 312 that are to be made as notifications |
| inputwsdl | The WSDL 304 thai is to be transformed |
| Outputwsdl | The target WSDL 300 produced by this module 214 |
| Verbose | Turn on verbose running (true/false) |

It should be noted that operation overloading within a port 308 type (see FIG. 3) by using different input or output messages is not permitted. This module 214 will find the first matching operation.

The deployment tool 220 (see FIG. 4), either separate to or part of the conversion tool 200, provides a convenience task for updating the deployment descriptor contained in the WSDL description 304. The default (empty) server skeleton implementation class framework 310 is supplanted by the custom implementation identified by the developer. The following is a list of example parameters for the module 214.

| Parameter | Meaning |
|---|---|
| Inputwsdd | The input WSDD file associated with the WSDL description 304. |
| Outputwsdd | The target WSDD file |
| notificationmethodnames | The names of the notification operations/methods 314 (comma separated), service port names 308 are determined as <notificationmethodname>Port |
| Serviceclasses | The names of the implementation classes of the framework 310 (comma separated) matching the notification ports 308 |
| maininterfaceport | The port name 308 of the main body of the deployed service interface 103 (the original service containing synchronous operations 315) |

| Parameter | Meaning |
|---|---|
| maininterfaceclass | The service class framework 302 that implements the main interface port |

It is noted that a standard class can be included in the conversion tool 200 that is used by the automatically generated client stubs (SubsData.java) of the class framework 302. This object contains the information illustrated above, and is instantiated to work with automatically generated notification stubs of the class framework 310.

Transformation Procedure Via the Conversion Tool 200

Figure 5:
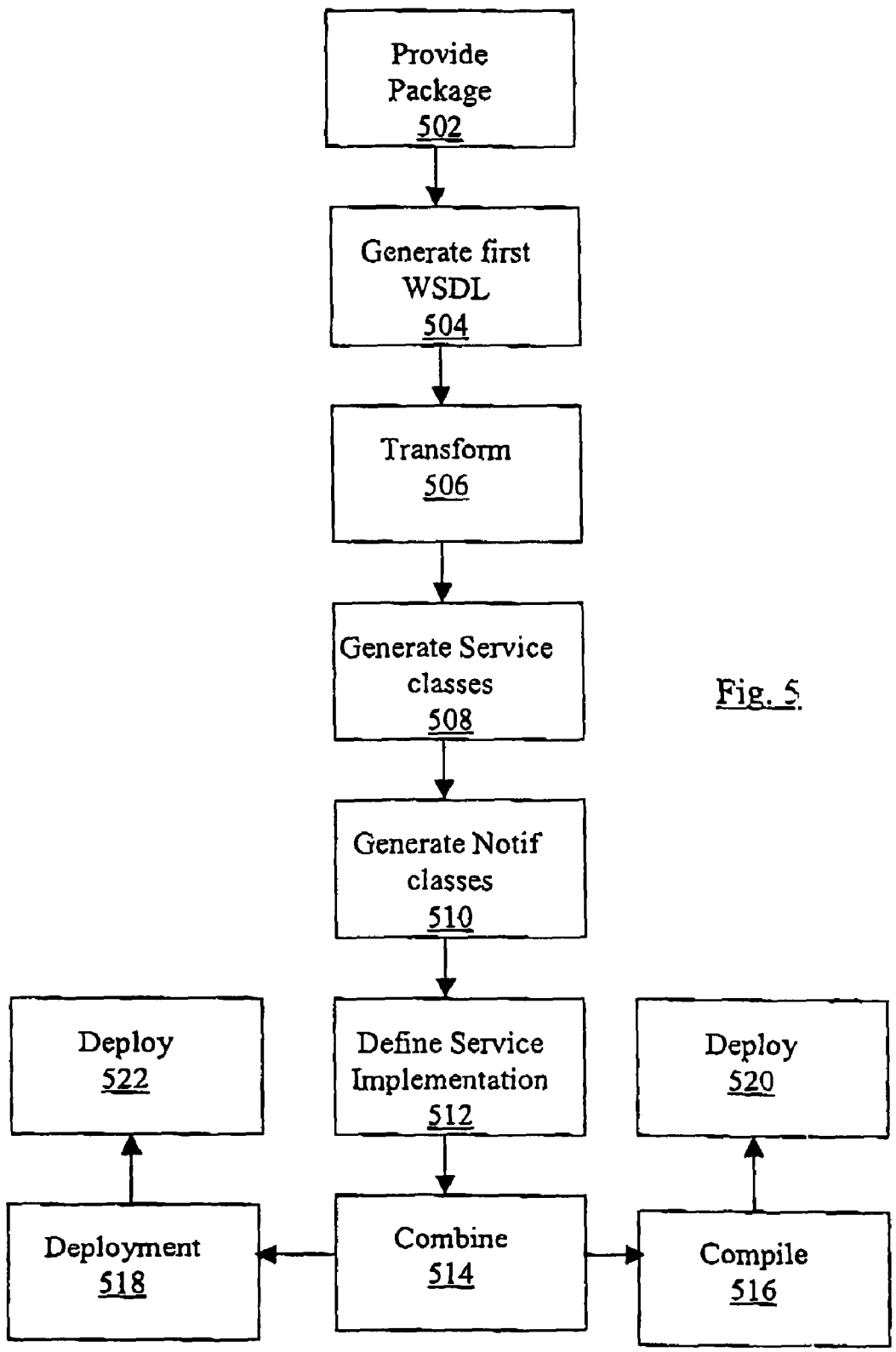
FIG. 5 is a flowchart for the operation of the tool of FIG. 2

Referring to FIGS. 3, 4 and 5, this section details the main steps in transforming the existing service description 312 (e.g. WSDL) into a notification-based description 304 (e.g. WSDL). As the procedure is built on ant modules 206, for example, the ant modules 206 used to do the transformation are identified at each step. In the present transformation example, the prerequisites used are as follows, by way of example only:

ant version 1.6 or greater;
typical Java interface class describing all web-service operations 314,315 (extends Remote);
developer can identify which of a set of operations 314 is to correspond to notification communications 115; and
transformation ant-modules 206 jar file has been built.

Define Web Service Interface

Referring to FIGS. 2, 3 and 5, the first step in the transformation process 500 is to provide 502 a package 202 of classes that define the proposed interfaces 110 (see FIG. 1).

This package 202 can contain such as but not limited to:
the service interface description for the eventual service 102 (extends java.rmi.Remote, each method throws java.rmi.RemoteException), including asynchronous/synchronous operations 314, 315;
an optional empty service implementation to carry parameter frames into the WSDL[1] description 312; and

[1] A quirk of working with AXIS tools, an empty implementation is provided to generate the method parameters names into the WSDL message parts classes describing complex types passed in the interface (e.g. Beans).

The developer includes in the package 202 a method/operation 314 for each notification communication 115 to be supported by the web service 102. It is recommended to put this definition into a separate source folder. The actual implementation of the web service 102 can be elsewhere. Once the first set of WSDL description 312 is generated there may be no need to return to this source package 202. Further, the first set of WSDL description 312 can be provided manually without relying on step 502 above.

Generate First Set of WSDL Definitions 312

This step 504 compiles the service definitions of the package 202 and generates the first set of WSDL description 312 that represents the eventual web service 102. The AXIS ant module 208 can be used to do the transformation. The inputs to the module 208 to accomplish this transformation are such as but not limited to:

service definition class;
service empty implementation class (optional as discussed in step 502);
DOCUMENT style production;
1.1 type mapping version; and
service 102 location (URL).

Transform First WSDL Description 312 to Subscription WSDL 304

This step 506 in the process 500 transforms the first WSDL description 312 into the subscription style WSDL description 304 which supports WS-EVENTING (i.e. notification based communications 115): The step 506 does the following:

generates a new PortType 308 for each notification method 314 identified in the WSDL description 312;
moves the notification description to the new port type 308;
adds a subscription operation 320 to the new port type 308;
adds an unsubscription operation 322 to the new port type 308;
generates appropriate bindings sections 326 for added operations; and
introduces required WS-EVENTING imports and namespaces (e.g. as defined in the rule set 211).

The module 210 is used to do the transformation of this step 506. Inputs to the module 210 are such as but not limited to:
notification method 314 names;
first WSDL description 312 location;
output WSDL description 304 location;
DOCUMENT style and/or the WS eventing rule set 211;
token to be used to name subscription methods 320; and
token to be used to name unsubscription methods 322.

The naming of generated port types 308 and subscription/unsubscription methods 320,322 is based on the notification method 314 names supplied. Notification method 314 names are a subset of the standard methods/operations identified in step 502.

Generate Service Class Framework 302

The next step 508 transforms the subscription style WSDL description 304 into the service classes framework 302 (i.e. conversion artifacts). The service classes framework 302 is a set of runtime artifacts that are deployed on the server 106 to handle interface/messaging/protocol conversions. The service classes framework 302 may contain no business logic, just the raw framework for marshalling and unmarshalling request communications 10,11 in the language of the web service 102 (i.e. SOAP over HTTP for standard web services 102). The service classes framework 302 provides the framework for exposing the developer supplied business methods that will handle SOAP messaging between the client device 100 and the web service 102. In our given example, this messaging is mediated by the application gateway 104. The AXIS ant module 216 is employed to do the generation of service classes framework 302. Ti-ds module 216 produces some default code and descriptors that will be replaced by the developer, such as but not limited to:

an empty service implementation for each port type of the notification based web service 102; and
a default AXIS deployment file (deploy.wsdd).

The inputs to the module 216 are as such as but not limited to:
"Application 124" deployment scope;
input subscription WSDL description 304; and
output folder.

Generate Notification Stub Classes

The next step 510 takes as input the subscription WSDL description 304 and produces class(es) of the class framework 310 (i.e. conversion artifacts) that will deliver the notification communications 115 to the Application Gateway 104. One such class is generated for each notification method 314 identified. The ant module 212 does this class framework 310 generation taking the following input such as but not limited to:

notification method 314 names;
subscription WSDL description 304 location;
output folder;
package of generated classes for the class framework 310; and

Stub Class 310 Naming

The naming of the generated stub classes of the class framework 310 can be derived from the notification method 314 identified in the subscription WSDL description 304, such as but not limited to:

public class<notification_method_name>PortEventSink.

Stub Notification Method

A single method 314 is generated onto the notification class framework 310. This method 314 takes parameters as identified in the WSDI description 304 message parts for the identified operation2, such as but not limited to:

2 Standard AXIS type mappings are used to map XSD types to java types according to the type specified; and
according to the order specified.

The first parameter is a SubsData object. This is preferred so that required information for generating the Application Gateway 104 compliant notification communication 115 is adhered to. The details of how this notification SOAP is generated by the SOAP module 114 (see FIG. 1) is typically of no interest to the web-service 102 developer. If the developer chooses not to go this route, the developer can write the invocation codes manually using AXIS classes, for example.

Define Service Implementation

This step 512 is where the web service 102 implementation is developed, being the actual heart of the web service 102. The developer takes the WSDL description 304 and the class frameworks 302,310 (in total representing the interface service description 204) and adds the business logic 108 to provide the deployed service definition 103. This falls broadly into two areas, such as but not limited to:

business domain specific and
subscription processing/asynchronous notification related.

The service implementation is typically a manual process done by the web service 102 developer and provides the implementation classes for each of the port type stub classes of the class framework 302 generated from step 508.

The server implementation represents where the main development effort for the eventual web service 102 is concentrated. This includes the business logic 108 driving the service implementation. For filter processing, each subscription operation 320 for a particular notification operation 314 contains a filter that provides the criteria for which a notification communication 115 should be delivered: e.g. ticker—"RIM-T" and price>10.00. The service developer provides the logic 108 that analyzes and supports the types of filters they provide. Matching filter criteria is used to determine when the notification communication 115 is to be sent to the device 110, for example via the gateway 104. The Subscribe object of the service definitions 103,105 captures this filter along with other required information (as described above with reference to subscription and notification contracts of web Service 102 Eventing) which is recorded.

Asynchronous Notification communications 115 are configured for sending asynchronously when a set of conditions matches the filter criteria. This implies that part of the service implementation will be threaded to support spontaneous delivery of the notification communication 115. The notification communication 115 itself can be delivered by using the appropriate notification stub classes of the class framework 310 generated from step 510. To do so the required information collected from the subscription operation 320 (encapsulated into the SubsData object) is provided.

Combine Implementation

This step 514 takes all of the generated classes of the frameworks 302,310 and combines them with the real web-service implementation provided in step 512 to provide for the deployable service definition 103. It is recognised that the class frameworks 302,310 (i.e. conversion artifacts) and the web service WSDL description 304 could be combined for presentation to the developer in order to allow the developer to implement step 512 for development of the business logic 108 and eventual service definitions 103,105.

Compile Complete Service

This step 516 compiles the product of step 514 in order to generate the interface service description 204 (a combination of components 304, 302, 310) for deployment as shown in FIG. 4 by the deployment module 220.

Generate Application Development WSDL Description 300

This step 518 transforms the subscription WSDL description 304 into a WSDL description 300 format that will be recognized by a notification builder (not shown) of the application development tool 402. The ant module 214 is used to do this transformation, including such as but not limited to:

adds the EventSource="true" property to each notification port type; and
transforms notification operations 314 to have no input message part, only an output part.

The input information to this module 214 is as follows, such as but not limited to:

notification method 314 names;
input subscription WSDL description 304; and
output notification WSDL description 300.

These WSDL descriptions 300 are typically published (at step 522) with the service 103,105 as a simple document. Doing so makes it available (i.e. discoverable) to the application development tool 420, which uses the WSDL definitions 300 information to generate subscription filters and notification messages appropriate for the application 124 (executed on the device 100) to communicate with the web service 102 using the defined communications 10,11,12,115 as described above.

Prepare AXIS Deployment Descriptor (Optional Automated)

The final step 520 in preparing the notification interface service definition 204 is deployment into AXIS (typically rung inside Tomcat), i.e. deployment of the service description 204 outputted from the tool 200 as the service interfaces 103,105 for provisioning in the service container 400 of the server 106 (see FIG. 4). The deployment tool 220 transforms the default WSDD generated in step 508 to include the correct service implementation class for each port 308.

It should be noted that the use of the deployment tool 220 is nothing more than a convenience for deployment purposes so that the descriptors of the service descriptions 103,105 need not be edited by hand every time the process is repeated. Use of the tool 220 can be an optional part of the transformation procedure 500. The inputs to the tool 220 are such as but not limited to:

notification method 314 names (the tool 220 will look for a service definition having a port type 308 derived from these names);
the corresponding service dependent implementations (see step 512);
the synchronous interface class;
the matching synchronous interface port 308;
input wsdd; and
output wsdd.

For the synchronous interface class and port 308, this corresponds to the unaltered section of the original WSDL definitions 314 (i.e. the part that was not altered to support subscription communications—see FIG. 3).

Referring to FIG. 4, illustrated is how components 304, 302, 310 are integrated together along with the business logic 108 and deployed to the web-service container 400 as the service interfaces 103,105. The Application Gateway 104 exchanges messages 10,11,12,115 (I.e. notifications subscriptions, request/responses etc) with the web service 102. The application development tool 420 builds the client application 124 based on the deployed web service 103 definition.

We claim:

1. A system for converting a synchronous service description to an asynchronous service description, the asynchronous service description for implementing on a server configured for communication with a respective client over a network, the system comprising:
- a computer processor;
- a subscription module defining a port type of the asynchronous service description for a notification operation associated with the synchronous service description and assigning a subscription operation to the defined port type;
- an artifact module generating a conversion artifact related to the notification operation, the conversion artifact configured for developing a deployable service implementation of the asynchronous service description; and
- an integration module combining the notification operation and the subscription operation and the conversion artifact to produce the asynchronous service description;
- wherein the artifact module is selected from the group consisting of: a notification module for generating a notification class framework containing a notification class for the notification operation, and a service module for generating a service class framework containing a service class deployed on the server, the service class handling message and protocol conversion;
- wherein the notification class is the conversion artifact when the artifact module is the notification module, and the service class is the conversion artifact when the artifact module is the service module; and
- wherein the asynchronous service description is configured for generating the deployable service implementation to include appropriate business logic for subsequent deployment on the server as an asynchronous service interface.

2. The system of claim 1, wherein the service class framework comprises the service class for marshalling and unmarshalling of communication elements of a communication protocol implemented by the asynchronous service interface.

3. The system of claim 1, wherein the notification class framework is configured to include a class for each notification operation associated with the synchronous service description.

4. The system of claim 1, further comprising a client module for including indicia in the asynchronous service description, the indicia configured for use in development of client applications compatible with the asynchronous service interface, the indicia for indicating the presence of the notification operation in the asynchronous service description.

5. The system of claim 4, wherein the indicia further indicate the presence of a subscription operation associated with the notification operation.

6. The system of claim 1, wherein the subscription module defines a new port type for each of notification operations associated with the synchronous service description, and moves the description of the notification operation to the new port type.

7. The system of claim 6, further comprising a rule set coupled to the subscription module, the rule set based on a Web Service Eventing standard format and assisting in the assigning of the subscription operation to the defined port type.

8. The system of claim 6, wherein the subscription module associates a subscribe name to the subscription operation and an unsubscribe name to an unsubscribe operation assigned to the defined port type.

9. The system of claim 2, wherein the service class framework provides a set of runtime artifacts for deployment on the server to assist in processing of protocol conversions.

10. A method for converting a synchronous service description to a asynchronous service description, the asynchronous service description for implementing on a server configured for communication with a respective client over a network, the method comprising:
- defining a port type of the asynchronous service description for a notification operation associated with the synchronous service description;
- assigning a subscription operation to the defined port type;
- generating a conversion artifact related to the notification operation, the conversion artifact configured for developing a deployable service implementation of the asynchronous service description; and
- combining the notification operation and the subscription operation and the conversion artifact to produce the asynchronous service description;
- wherein generating the conversion artifact generates:
  - a notification class framework containing a notification class for the notification operation; or
  - a service class framework containing a service class for deploying on the server, the service class handling message and protocol conversion;
- wherein the notification class is the conversion artifact when the notification class framework is generated, and the service class is the conversion artifact when the service class framework is generated; and wherein the asynchronous service description is configured for generating the deployable service implementation to include appropriate business logic for subsequent deployment on the server as an asynchronous service interface.

11. The method of claim 10, further comprising configuring the service class framework to contain the server class for marshalling and unmarshalling of communication elements of a communication protocol implemented by the asynchronous service interface.

12. The method of claim 10, further comprising configuring the notification class framework to include a class for each notification method associated with the synchronous service description.

13. The method of claim 10, further comprising including indicia in the asynchronous service description, the indicia configured for use in development of client applications compatible with the asynchronous service interface, the indicia for indicating the presence of the notification operation in the asynchronous service description.

14. The method of claim 13, wherein the indicia further indicate the presence of a subscription operation associated with the notification operation.

15. The method of claim 10, further comprising defining a new port type for each of notification methods associated with the synchronous service description, and moves the description of the notification operation to the new port type.

16. The method of claim 15, further comprising using a rule set based on a Web Service Eventing standard format and assisting in the assigning of the subscription operation to the defined port type.

17. The method of claim 15, further comprising associating a subscribe name to the subscription operation and associating an unsubscribe name to an unsubscribe operation assigned to the defined port type.

18. The system of claim 11, wherein the service class framework provides a set of runtime artifacts for deployment on the server to assist in processing of protocol conversions.

* * * * *